(12) United States Patent
Kato

(10) Patent No.: US 8,154,706 B2
(45) Date of Patent: Apr. 10, 2012

(54) SCANNING OPTICAL DEVICE, IMAGE FORMING APPARATUS USING THE SAME, AND METHOD OF ADJUSTING SCANNING OPTICAL DEVICE

(75) Inventor: Manabu Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 12/244,718

(22) Filed: Oct. 2, 2008

(65) Prior Publication Data

US 2009/0091732 A1 Apr. 9, 2009

(30) Foreign Application Priority Data

Oct. 9, 2007 (JP) ................................. 2007-263058

(51) Int. Cl.
*G03B 27/00* (2006.01)
*H04N 1/04* (2006.01)
*G02B 26/08* (2006.01)
*G02B 26/12* (2006.01)
*B41J 27/00* (2006.01)

(52) U.S. Cl. ....... 355/67; 358/474; 359/204; 359/216.1; 347/260; 347/261

(58) Field of Classification Search .................. 358/474; 359/204, 216.1; 355/67; 347/260, 261
See application file for complete search history.

(56) References Cited

U.S. PATENT DOCUMENTS

| 5,963,356 A | 10/1999 | Kato | 359/216 |
|---|---|---|---|
| 7,050,209 B2 | 5/2006 | Kato | 359/204 |
| 7,053,922 B2 | 5/2006 | Kato et al. | 347/244 |
| 7,057,782 B2 * | 6/2006 | Kudo | 359/216.1 |
| 7,064,877 B2 | 6/2006 | Kato | 359/204 |
| 2003/0112486 A1 | 6/2003 | Kudo | 359/216 |
| 2004/0169905 A1* | 9/2004 | Hayashi et al. | 359/204 |

FOREIGN PATENT DOCUMENTS

| EP | 1788421 | 5/2007 |
|---|---|---|
| JP | 2003-222812 | 8/2003 |
| JP | 2006-337679 | 12/2006 |

OTHER PUBLICATIONS

European Search Report dated Mar. 25, 2009 from corresponding European Application No. 08017634.0.
European Examination Report dated May 18, 2010 from corresponding European Application No. 08017634.0.
European Official Letter dated Nov. 18, 2011 from corresponding European Application No. 08017634.0.

* cited by examiner

*Primary Examiner* — Charlotte M Baker
*Assistant Examiner* — Rury Grisham
(74) *Attorney, Agent, or Firm* — Fizpatrick, Cella, Harper & Scinto

(57) ABSTRACT

A scanning optical device including a plurality of light source devices 1*a*-1*d*, a light beam converting system 3 for converting the light focus state of the plurality of light beams emitted from light emitting members of the light source devices, a deflecting member 5 for scanningly deflecting the light beam from the light beam converting system, and imaging optical members 6*a*-6*d* for imaging the light beam from the deflecting member upon scan surfaces 8*a*-8*d* corresponding to the light beams, respectively, wherein the light beam converting system is comprised of a plurality of optical elements 3*a*-3*d* formed integrally and each converting the light focus state of associated one of the light beams from the light source devices, and wherein the light source devices are fixed to a holding member 12 while the positions with respect to the associated optical elements are adjusted.

7 Claims, 8 Drawing Sheets

SCANNING OPTICAL DEVICE, IMAGE FORMING APPARATUS USING THE SAME, AND METHOD OF ADJUSTING SCANNING OPTICAL DEVICE

FIELD OF THE INVENTION AND RELATED ART

This invention relates to an optical scanning device and an image forming apparatus using the same. The present invention is suitably usable in an image forming apparatus such as a laser beam printer (LBP), a digital copying machine or a multifunction printer, for example, having an electrophotographic process.

Conventionally, in the scanning optical devices such as a laser beam printer (LBP), optical modulation based on an imagewise signal is carried out to a light beam emitted from a light source means.

Then, the light beam having been optically modulated is periodically deflected by an optical deflector comprising a polygon mirror, for example. Subsequently, by an imaging optical means (imaging optical system) having an f-θ characteristic, the light beam is focused on a photosensitive recording medium surface in the shape of a spot. By optically scanning the recording medium, image recording is carried out thereon.

FIG. 11 is a schematic diagram of a main portion of a conventional scanning optical device.

In FIG. 11, a divergent light beam emitted from a light source means 1 is transformed into a parallel light beam by a collimator lens 3. The parallel light beam is then restricted by an aperture stop 2 and is incident on a cylindrical lens 4.

Within a main-scan section, the parallel light beam incident on the cylindrical lens 4 goes out of the same while being unchanged thereby.

On the other hand, within a sub-scan section, the light beam is converged and is imaged as a line image on the deflecting surface (reflection surface) of a deflecting means 5 which comprises a polygon mirror.

The light beam deflectively reflected by the deflecting surface of the deflecting means 5 is directed toward a surface to be scanned (scan surface) 8 through an imaging optical element (f-θ lens) 6 having f-θ characteristic.

Then, by rotating the deflecting means 5 in the direction of an arrow A, the scan surface 8 is scanned in the direction of an arrow B (main-scan direction).

Conventionally, various scanning optical devices of tandem type have been proposed (see patent document No. 1).

FIG. 12 is a sectional view in the main-scan direction (main-scan sectional view) of a main portion of a scanning optical device of conventional tandem type.

In FIG. 12, a plurality of divergent light beams emitted from a plurality of light source means 91a and 91b are restricted by a plurality of stops 92a and 92b, respectively. Then, by means of a plurality of collimator lenses 93a and 93b, these light beams are transformed into parallel light beams, and these are incident on cylindrical lenses 94a and 94b, respectively.

A plurality of light beams emitted from the cylindrical lenses 94a and 94b are incident on different deflecting surfaces 95a and 95b of an optical deflector (polygon mirror) 95 as a deflecting means, as a line image, by which the light beams are scanningly deflected toward different directions, respectively.

These light beams are respectively directed through different imaging optical means 99a and 99b, toward different scan surfaces 98a and 98b.

[Patent Document No. 1]
Japanese Laid-Open Patent Application No. 2003-222812

In the conventional example of FIG. 12, from the standpoint of convenience in assembly, the cylindrical lenses 94a and 94b are provided by placing a plurality of optical elements in an array in the main-scan direction and forming them integrally by plastic molding.

Patent document No. 1 discloses an example in which cylindrical lenses which are generally placed in association with respective light sources are formed integrally, and it states that this arrangement enables reduction in size of the overall system.

In recent years, in the scanning optical devices of tandem type, from the standpoint of further reduction in size and convenience in assembly, unification of collimator lenses for converting the state of a light beam from a light source means into another state has been desired.

However, the unification of collimator lenses has been considered difficult, for the following reasons.

(1) With respect to light emitting members of a plurality of light source means, the positions in the optical axis direction of collimator lenses which correspond to the light emitting members, respectively, as well as the positions of the collimator lenses in the direction perpendicular to the optical axis direction must be adjusted (hereinafter, this will be referred to as "laser adjustment").

(2) When in the laser adjustment the light source means side is to be adjusted, since the shape of the laser package is very complicated, the laser light source means has to be once press-fitted into an intermediate member and then it has to be adjusted.

(3) Since the plurality of light source means are disposed very close to each other, the adjusting mechanism itself or a gripping tooling therefor may physically interfere.

(4) In the case of unification by plastic molding, the focus position after the light beam conversion may be deviated due to environmental (temperature) changes.

SUMMARY OF THE INVENTION

The present invention provides a scanning optical device and/or an image forming apparatus having the same, by which unification of stations (scanning units) is accomplished and convenience in assembly is improved significantly.

In accordance with an aspect of the present invention, there is provided a scanning optical device, comprising: a plurality of light source means having a plurality of light emitting members, disposed spaced apart from each other in a main-scan direction; light beam converting means configured to convert a light focus state of a plurality of light beams emitted from said plurality of light emitting members; deflecting means having a deflecting surface and configured to scanningly deflect a plurality of light beams from said light beam converting means; and an imaging optical system configured to image a plurality of light beam scanningly deflected by said deflecting surface of said deflecting means, upon different scan surfaces corresponding to the plurality of light beams, respectively; wherein said light beam converting means is comprised of a plurality of optical elements formed integrally and each being configured to convert the light focus state of associated one of the plurality of light beams emitted from said plurality of light emitting members, and wherein, when within a main-scan section a spacing in the main-scan direction of centers of light entrance surfaces of said plurality of optical elements constituting said light beam converting means is denoted by Cm, and a spacing in the main-scan direction of said plurality of light emitting members of said plurality of light source means is denoted by Lm, a relation $$Cm<Lm$$

is satisfied.

In one preferred form of this aspect of the present invention, said plurality of light source means are fixed to one and the same holding member.

The plurality of light beams emitted from said plurality of light emitting members of said plurality of light source means may be incident on different deflecting surfaces of said deflecting means.

Each of said plurality of optical elements of said light beam converting means may comprise a collimator lens configured to convert a light beam emitted from said light emitting member of said light source means into a parallel light beam.

When a spacing in the main-scan direction of said plurality of light emitting members of said plurality of light source means is denoted by Lm, a spacing in the sub-scan direction of said plurality of light emitting members of said plurality of light source means is denoted by Ls, and a maximum contour of a package of one light source means of said plurality of light source means is denoted by P, a relation $$Max(Lm,Ls)>2P$$

may be satisfied, where Max(Lm,Ls) denotes the value of larger one of the spacings Lm and Ls.

When an angle defined within the main-scan section by two light beams incident on different deflecting surfaces of said deflecting means is denoted by θmi (deg), a relation $$1°<\theta mi<10°$$

may be satisfied.

Each of optical axes of said plurality of optical elements constituting said light beam converting means may be decentered within the main-scan section.

When a longitudinal magnification in the main-scan section between said light emitting member of said light source means and the scan surface is denoted by αm, a relation $$\alpha m<100$$

may be satisfied.

In accordance with another aspect of the present invention, there is provided an image forming apparatus, comprising: a plurality of image bearing members disposed respectively at scan surfaces of a scanning optical device as recited above and configured to form images of different colors.

The image forming apparatus may further comprise a printer controller configured to convert a color signal inputted from an external equipment into image data of different colors and to apply the same to individual scanning optical devices.

In accordance with another aspect of the present invention, there is provided a scanning optical device, comprising: a plurality of light source means having a plurality of light emitting members, disposed spaced apart from each other in a main-scan direction; light beam converting means configured to convert a light focus state of a plurality of light beams emitted from said plurality of light emitting members; deflecting means having a deflecting surface and configured to scanningly deflect a plurality of light beams from said light beam converting means; and an imaging optical system configured to image a plurality of light beam scanningly deflected by said deflecting surface of said deflecting means, upon different scan surfaces corresponding to the plurality of light beams, respectively; wherein said light beam converting means is comprised of a plurality of optical elements formed integrally and each being configured to convert the light focus state of associated one of the plurality of light beams emitted from said plurality of light emitting members, and wherein, when a spacing in the main-scan direction of said plurality of light emitting members of said plurality of light source means is denoted by Lm, a spacing in the sub-scan direction of said plurality of light emitting members of said plurality of light source means is denoted by Ls, and a maximum contour of a package of one light source means of said plurality of light source means is denoted by P, a relation $$Max(Lm,Ls)>2P$$

is satisfied, where Max(Lm,Ls) denotes the value of larger one of the spacings Lm and Ls.

In accordance with a further aspect of the present invention, there is provided an image forming apparatus, comprising: a plurality of image bearing members disposed respectively at scan surfaces of a scanning optical device as recited above and configured to form images of different colors.

In this aspect of the present invention, the image forming apparatus may further comprise a printer controller configured to convert a color signal inputted from an external equipment into image data of different colors and to apply the same to individual scanning optical devices.

In accordance with a yet further aspect of the present invention, there is provided a method of adjusting a scanning optical device which includes a plurality of light source means having a plurality of light emitting members, disposed spaced apart from each other in a main-scan direction, light beam converting means configured to convert a light focus state of a plurality of light beams emitted from the plurality of light emitting members, deflecting means having a deflecting surface and configured to scanningly deflect a plurality of light beams from the light beam converting means, and an imaging optical system configured to image a plurality of light beam scanningly deflected by the deflecting surface of the deflecting means, upon different scan surfaces corresponding to the plurality of light beams, respectively, wherein the light beam converting means is comprised of a plurality of optical elements formed integrally and each being configured to convert the light focus state of associated one of the plurality of light beams emitted from the plurality of light emitting members, characterized in that: each of the plurality of light source means is fixed to a holding member while a position thereof in an optical axis direction and a position thereof in a direction perpendicular to the optical axis, with respect to associated one of the plurality of optical elements, are adjusted.

In this aspect of the present invention, the plurality of light source means may be fixed to one and the same holding member.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
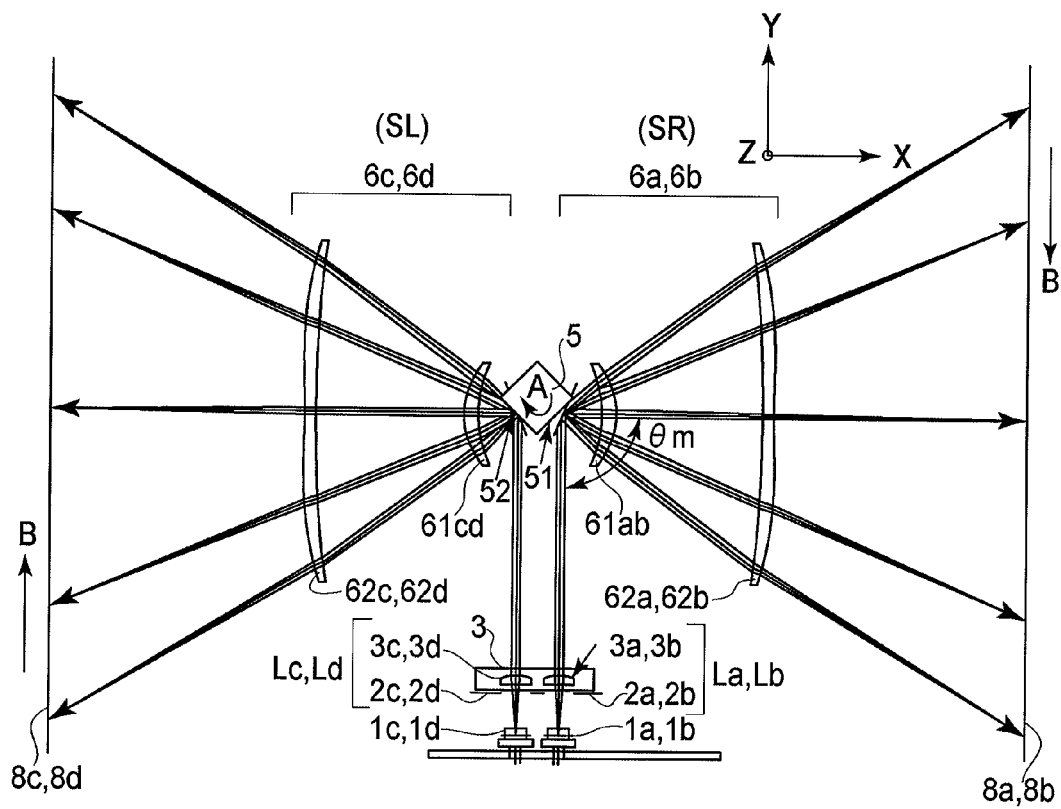
FIG. 1 is a sectional view in the main-scan direction of a main portion of a scanning optical device according to a first embodiment of the present invention.

FIG. 1 is a sectional view (main-scan sectional view) of a main portion of a first embodiment of the present invention, along a main-scan direction.

Figure 2:
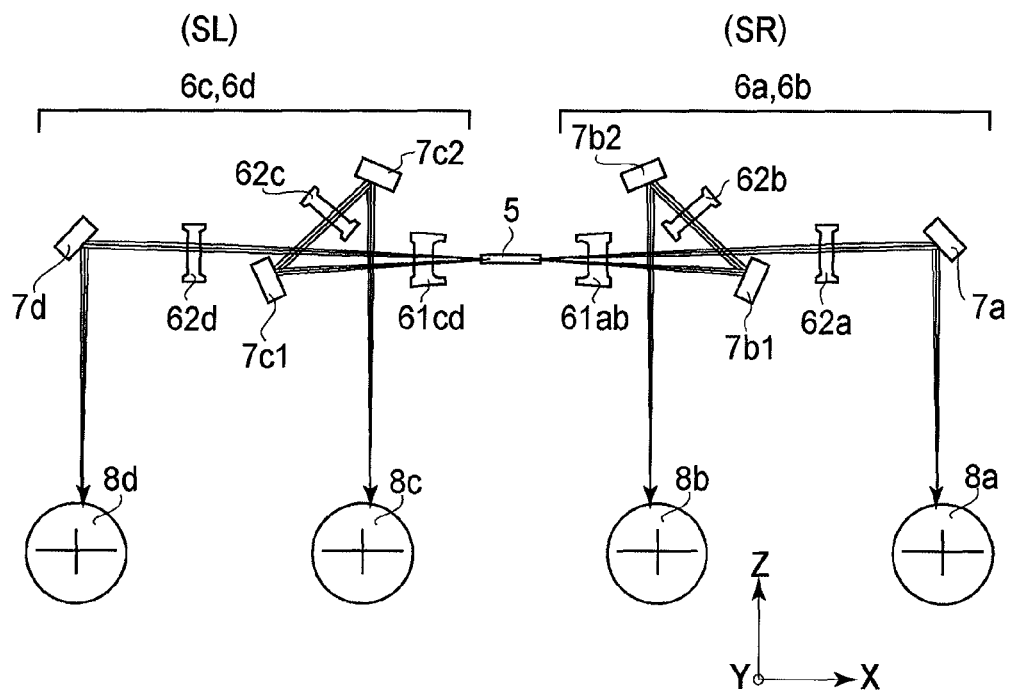
FIG. 2 is a sectional view in the sub-scan direction of a main portion of the scanning optical device according to the first embodiment of the present invention, from a deflecting means to a surface to be scanned (scan surface).

FIG. 2 is a sectional view (sub-scan sectional view) of a main portion of the first embodiment of the present invention, along a sub-scan direction.

Figure 3:
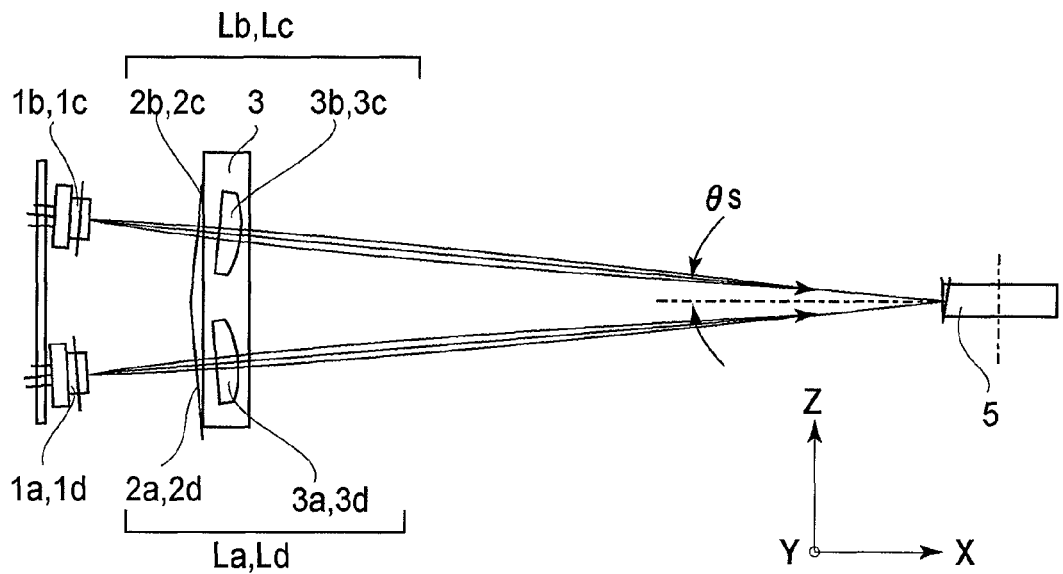
FIG. 3 is a sectional view in the sub-scan direction of a main portion of the scanning optical device according to the first embodiment of the present invention, from the deflecting means to the light source side.

FIG. 3 is a sub-scan sectional view of the first embodiment of the present invention, from a deflecting means to a light source means side.

In the following description, the term "main-scan direction" (Y-direction) refers to a direction in which a light beam is scanningly deflected by an optical deflector.

The term "sub-scan direction" (Z-direction) refers to a direction which is parallel to the rotational axis of the deflecting means.

The term "main-scan section" refers to a plane with respect to which the sub-scan direction (Z-direction) is a normal.

The term "sub-scan section" refers to a plane with respect to which the main-scan direction (Y-direction) is a normal.

Denoted in the diagram at 1a-1d are light source means each having a light emitting member (light emission point). These are comprised of a semiconductor laser, for example.

Denoted at 2a-2d are stops which function to restrict a light beam (light quantity).

Denoted at 3 is a light beam converting means. The light beam converting means 3 is comprised of a plurality of optical elements 3a-3d which are formed integrally and which have a function for converting the light focus state of the light beams emitted from the plurality of light source means 1a-1d as well as a function for converting the light beam into a line image extending in the main-scan direction upon the deflecting surface of the deflecting means 5.

The optical axes of the plurality of optical elements 3a-3d constituting the light beam converting means 3 in the present embodiment are decentered within the main-scan section.

It should be noted that the stops 2a-2d and the elements of the light beam converting means 3 are components of an input optical system (light collecting optical system) La-Ld.

Denoted at 5 is an optical deflector as the deflecting means (deflection device) which comprises a rotary polygonal mirror (polygon mirror) having a plurality of deflecting surfaces. It is rotated at a constant speed in the direction of an arrow A by a driving means such as a motor, for example, to scanningly deflect the light beams from the input optical system La-Ld.

Denoted at 6a-6d are imaging optical means each being an imaging optical system. These imaging optical means function to image a plurality of light beams from the deflecting means 5 upon scan surfaces (surfaces to be scanned) 8a-8d which correspond to the respective light beams.

The imaging optical means 6a and 6b at the station (scan unit) SR side have common lenses, that is, a first imaging lens 61ab and second imaging lenses 62a and 62b. The imaging optical means 6c and 6d at the station SL side have common lenses, that is, a first imaging lens 61cd and second imaging lenses 62c and 62d.

These imaging optical means 6a-6d function to image light beams based on the imagewise information and having been deflected by respective optical deflector 5 surfaces, upon photosensitive drum surfaces 8a-8d (scan surfaces) corresponding these light beams, respectively.

Also, these imaging optical means 6a-6d function to provide a conjugate relationship between the deflecting surfaces 51 and 52 of the optical deflector 5 and the photosensitive drum surfaces 8a-8d within the sub-scan section, thereby to perform surface tilt compensation of the deflecting surfaces 51 and 52.

Denoted at 7a, 7b1 and 7b2 are mirrors (reflecting mirrors) at the station SR side, which function to bend the light path within the station SR. Denoted at 7c1, 7c2 and 7d are mirrors (reflecting mirrors) at the station SL side, which function to bend the light path within the station SL.

Denoted at 8a and 8b are photosensitive drum surfaces as the scan surfaces at the each station SR side. Denoted at 8c and 8d are photosensitive drum surfaces as the scan surfaces at the station SL side.

[Scanning Optical Device]

The scanning optical device of the present embodiment is configured to direct the light beams emitted from the light emitting members of four light source means 1a-1d toward four different scan surfaces 8a-8d, respectively, to optically scan these surfaces.

In the following functional description of the scanning optical device, for simplicity, only the light beam from one light source means 1a will be explained.

A divergent light beam emitted from the semiconductor laser 1a which is light source means is restricted in its light quantity by a stop 2a. Then, it is incident on a corresponding optical element 3a of the light beam converting means 3.

The optical element 3a converts the light beam from the light source means 1a into a parallel light beam, within the main-scan section (main-scan direction). Also, within the sub-scan section (sub-scan direction), it converts the state of the light beam so that the light beam is imaged on the deflecting surface 51 of the deflecting means.

The light beam incident on the deflecting means 5 is scanningly deflected by the deflecting surface 51 toward the scan surface, and it is incident on the imaging optical means 6a.

In the present embodiment, the imaging optical means 6a is comprised of a first toric lens (imaging lens) 61ab made of plastic and having a power mainly in the main-scan direction and a second toric lens (imaging lens) 62a made of plastic and having a power mainly in the sub-scan direction.

Furthermore, the imaging optical means 6a functions to image the deflected light beam from the deflecting surface 51 upon the scan surface 8a and to compensate any tilt of the deflecting surface 51.

The first toric lens 61ab in the present embodiment is used in both of the two sets of imaging optical means 6a and 6b, as described above.

It is to be noted that the structure and production method of the imaging optical means 6a are not limited to this.

The light beam imaged on the scan surface 8a by the imaging optical means 6a deflectively scans the scan surface 8a in the direction of an arrow B (main-scan direction) at a constant angular-speed, with the rotation of a polygon mirror attached to a motor shaft (not shown).

[Tandem Type Scanning Optical Device]

Since the scanning optical device of the present embodiment has these four scan functions, it is a tandem type scanning optical device in which imagewise information corresponding to different hues are simultaneously recorded on different scan surfaces. This will be explained below in greater detail.

As shown in FIG. 1 and FIG. 3, the four light source means 1a-d of the present embodiment are disposed spaced apart from each other in the main-scan direction and in the sub-scan direction.

Among them, the light beams emitted from the light emitting members of the light source means 1a and 1b are incident on the deflecting surface 51 of the deflecting means 5, while the light beams emitted from the light emitting members of the light source means 1c and 1d are incident on the deflecting surface 52 of the deflecting means 5. Thus, these light beams are separated rightwardly and leftwardly of the deflecting means 5.

Furthermore, the light beams emitted from the light emitting members of the light source means 1a and 1b have different incidence angles in the sub-scan section, and these light beams are obliquely incident on the deflecting surface 51 of the deflecting means 5. Thus, by means of a mirror 7b1 disposed after the first toric lens 61ab, these light beams are spatially separated from each other.

This is also the case with the light beams emitted from the light emitting members of the light source means 1c and 1d.

By projecting a plurality of light beams, having different oblique incidence angles with respect to the deflecting means (polygon mirror) 5, onto two different deflecting surfaces 51 and 52 of the deflecting means 5, as described above, it is assured that four light beams are simultaneously scanned by a single deflecting means 5.

[Light Beam Converting Means]

Next, the light beam converting means 3 and the optical element 3a constituting the same in the present embodiment will be explained.

The optical element 3a has a function as a collimator lens for transforming the light beam from the light emitting member of the light source means 1a into a parallel light beam.

More specifically, the optical element 3a has a composite function as a collimator lens and as an anamorphic collimator lens (cylindrical lens) for converting the light beam into a line image extending in the main-scan direction upon the deflecting surface 51 of the deflecting means 5.

The light beam converting means 3 is comprised of an optical element made by plastic molding. A single optical element 3 provides the function of four pieces of collimator lenses and four pieces of cylindrical lenses.

Thus, the device structure sufficiently contributes not only to the simplification of the optical system but also to enhancement of reduction in size and convenience in assembly of the device.

Table 1 shows designs value of components from the light source means to deflecting means, in the present embodiment.

The light entrance surface (light source means side surface) of the optical element (anamorphic collimator lens) 3a is comprised of a diffraction surface formed on its optical surface and having a diffraction grating with different powers with respect to the main-scan direction and sub-scan direction.

Furthermore, the light exit surface is comprised of a refracting surface having different powers with respect to the main-scan direction and sub-scan direction, namely, an anamorphic surface.

Here, the reason why a diffraction surface is used at the light entrance surface is to correct any power change due to a refractive index variation of the plastic material caused by a temperature rise.

More specifically, the reason is to correct the same through the power change by a wavelength shift which is similarly caused by the temperature rise, namely, through strong longitudinal chromatic aberration by the diffraction surface.

Here, the diffraction surface in the present embodiment has such shape that a diffraction grating which can be presented by the following phase function is added to a base refracting surface.

$$\phi = m\lambda = d_{2m}Y^2 + d_{2s}Z^2$$

where m is the order of diffraction and, in the present embodiment, +1st order light is used.

Figure 4:
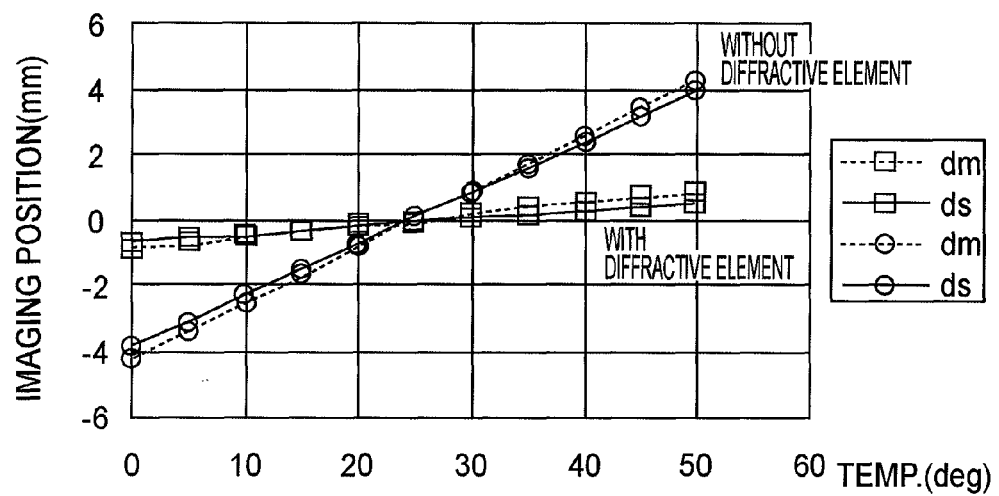
FIG. 4 is a graph illustrating the temperature dependency of the focus, in the scanning optical device of the first embodiment of the present invention.
Figure 5:
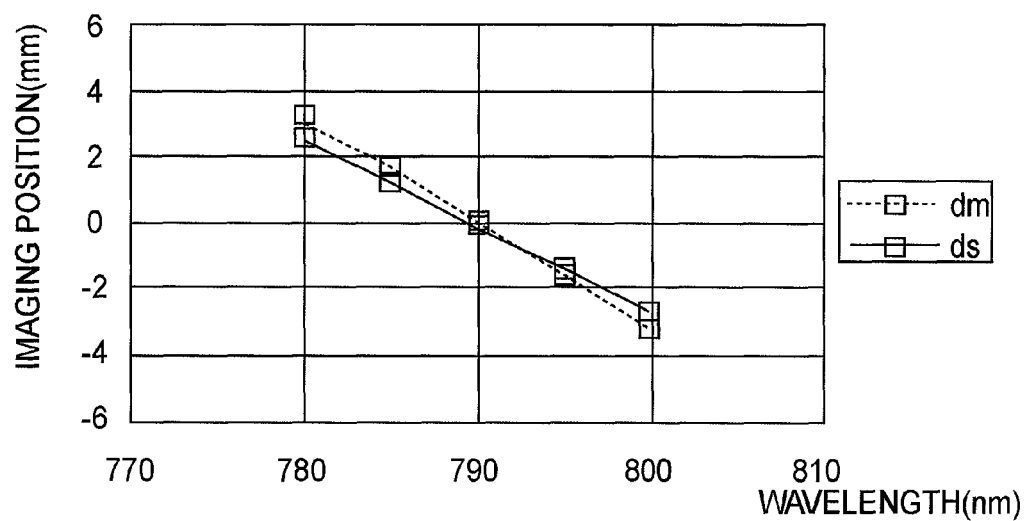
FIG. 5 is a graph illustrating the wavelength dependency of the focus, in the scanning optical device of the first embodiment of the present invention.

FIG. 4 is a diagram illustrating the temperature dependency of the imaging position (focus) of the scanning optical device, and FIG. 5 is a diagram illustrating the wavelength dependency of the same, likewise.

In these diagrams, dotted lines depict the focus position in the main-scan direction, and solid lines depict the focus position in the sub-scan direction.

It is seen from FIG. 4 that, by use of the diffraction surface in the light beam converting means 3, the focus shift due to the temperature change is suppressed to ⅕ or less as compared with a case where no diffraction surface is used.

Furthermore, in this embodiment, the longitudinal magnification $\alpha m$ in the main-scan direction which is defined between the light source means and the scan surface is set to be smaller than a predetermined value (100×), by which a focus change on the scan surface resulting from a change in the distance between the light source means and the light beam converting means 3 is well reduced.

More specifically, in this embodiment, if the longitudinal magnification within the main-scan section between the light emitting member the light source means and the scan surface is denoted by $\alpha m$, the structure is set to satisfy the following condition.

$$\alpha m < 100 \tag{1}$$

Here, the lower limit of the longitudinal magnification $\alpha m$ had better satisfy $$10 < \alpha m \tag{1a}$$

On the other hand, as shown in FIG. 5, the focus change due to the wavelength shift without accompanied by the refractive index fluctuation such as the initial wavelength dispersion may become large as compared with conventional devices. However, this can adjusted by laser focus adjustment to be explained later, and it does not raise a problem.

As described above, in the present embodiment, because of the use of the diffraction surface, even if the light beam converting means 3 is made of a plastic material, the focus change due to the temperature rise is reduced to an amount which can be practically disregarded.

It is to be noted that, although the present embodiment has been described with reference to an example of light beam converting means 3 made by plastic molding, the light beam converting means may be made by glass molding which is more stable against the environmental variation.

Furthermore, even with the use of an ordinary collimator lens which does not have a function of cylindrical lens, the advantageous effects of the invention will be obtained.

around the light emission axis, so that the pitch spacing of a plurality of light beam on the scan surface takes a predetermined value.

These adjustment processes are optically the same even if whichever one of the semiconductor laser and the collimator lens is moved. However, since the semiconductor laser has to be fixed onto an electric base plate by soldering or the like, generally the collimator lens side which is easier to adjust is moved.

However, in the present embodiment, since the collimator lens side is comprised of four optical elements formed into an integral structure, adjusting the positions individually is difficult to do.

In consideration of this, in the present embodiment, the positions of the plurality of semiconductor laser $1a$-$1d$ with respect to the corresponding optical elements $3a$-$3d$, respectively, are adjusted and, by doing this, the focus of the semiconductor lasers $1a$-$1d$ as well as the irradiation positions of

TABLE 1

First Embodiment

|  | Rm | Rs | D | N |
|---|---|---|---|---|
| Light Sources 1a-1d |  |  | 2.00 |  |
| Cover Glass R1 | infinite |  | 0.25 | 1.51052 |
| Cover Glass R2 |  |  | 13.55 |  |
| Stops 2a-2d |  |  | 2.53 |  |
| Anamophic Collimator 3R1 | infinite *(1) |  | 3.00 | 1.52397 |
| Anamophic Collimator 3R2 | −14.4784 | −12.0823 | 92.68 |  |
| Optical Origin |  |  |  |  |

| Anamorphic Collimator Phase Coefficient | d2m: −7.83313E−3;   d2s: −9.89926E−3 |
|---|---|
| No. of Polygon Surfaces | 4 |
| Polygon Circumscribed Circle Diameter | φ 20 |
| Optical Origin to Polygon Rotational Center | x: −5.4; Y: 4.6 |
| Main-Scan Direction Incidence Angle θm | 90 |
| Sub-Scan Direction Incidence Angle θs | 5 |
| Angle θmi Defined by Light Beams Incident on Different Deflecting Surfaces | 0 |
| Spacing Lm between Light Sources in Main-Scan Direction | 10.80 |
| Spacing Ls between Light Sources in Sub-Scan Direction | 19.87 |
| Maximum Contour P of Package of Light Source Means | 5.6 |
| Main-Scan Longitudinal Magnification αm between Light Source and Scan Surface | 52.2 |

[Laser Adjustment]

Next, the light source means $1a$-$1d$ in the present embodiment and the adjustment method therefor will be explained.

The semiconductor laser which is a light source means and the light beam converting means (hereinafter, this will be referred to also as "collimator lens") need the following adjustment (laser adjustment).

(a) Focus Adjustment Step:

The distance between the collimator lens and the semiconductor laser should be adjusted so that the outgoing beam becomes a predetermined parallel light beam or, alternatively, a convergent light beam or a divergent light beam.

(b) Irradiation Position Adjustment Step:

The coaxiality (the position in the direction perpendicular to the optical axis) between the semiconductor laser and the collimator lens should be adjusted so that the outgoing beam impinges on a predetermined target.

(c) Pitch Spacing Adjustment Step:

In the case of a multi-beam scanning optical device, the semiconductor laser should be adjusted by rotating the same them are adjusted. Afterwards, the semiconductor lasers are fixed to one and the same holding member.

Figure 6:
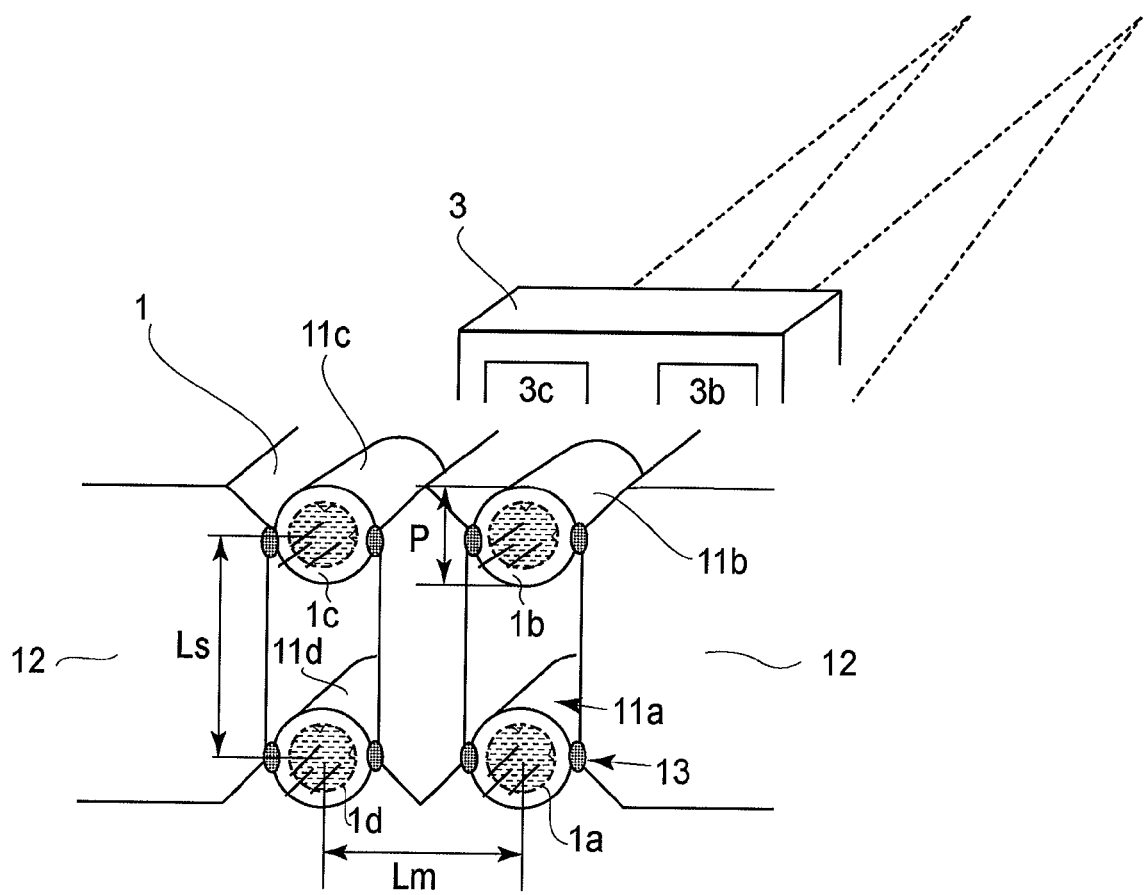
FIG. 6 is a schematic diagram of a main portion of a light source and a light beam converting means, in the scanning optical device of the first embodiment of the present invention.

FIG. 6 is a schematic diagram of a main portion of the light source means 1 in the present embodiment and the light beam converting means 3. With reference to the drawing, the laser adjustment mechanism will be explained.

The laser packages of semiconductor lasers $1a$-$1d$ (light source means) are press-fitted into laser barrels $11a$-$11d$, respectively, and these are gripped by a jig tool not shown.

In this state, the semiconductor lasers $1a$-$1d$ are excited to emit lights, and the positions of the laser barrels $11a$-$11d$ with respect to the optical axis direction and the direction perpendicular to it are adjusted so that the focus and irradiation position of each laser $1a$-$1d$ come to predetermined positions.

In the case of a multi-beam scanning optical device, rotary adjustment may be made around the light emission axis of the semiconductor laser.

With regard to the method of measuring the focus of the laser and the irradiation position thereof in the adjustment procedure, various methods are available: a method in which the optical deflector is demounted and a jig lens is inserted, and then the focus position and irradiation position on a chart surface are measured; a method in which the focus and irradiation position are measured through an imaging optical element to be used actually; and so on.

Once the positions of the laser barrel 11a-11d are fixed, UV light (ultraviolet rays) is projected to irradiate an UV hardening type adhesive 13 which has been applied beforehand into the clearance between the laser barrels 11a-11d and the laser barrel holding member 12 of an optics box, to solidify the adhesive and fixedly secure them.

As described above, in this embodiment, four semiconductor lasers 1a-1d are integrally mounted to the laser barrel holding member 12 of the optics box, as one and the same holding member, through the respective laser barrels 11a-11d.

With this arrangement, base boards for driving the semiconductor lasers 1a-1d can be unified.

In order to perform such adjustment, the semiconductor laser should have a space for accommodating a jig tool for gripping the laser barrel and a space for disposing a fiber for UV light irradiation.

In order to perform precise laser adjustment after having secured these spaces, the spacing between adjacent light source devices with respect to at least one of the main-scan direction and the sub-scan direction should be made larger than the maximum contour of the package of the semiconductor laser to be used actually.

More specifically, if the spacing in the main-scan direction of the light emitting members of a plurality of light source means is denoted by Lm, the spacing of them in the sub-scan direction is denoted by Ls, and the maximum contour of the package of a single light source means is denoted by P, the following condition should be satisfied.

$$\text{Max}(Lm, Ls) > 2P \quad (2)$$

where Max(Lm,Ls) refers to the value of larger one of the spacings Lm and Ls.

In this embodiment, by taking the oblique incidence angle θs in the sub-scan direction as large as θs=5 degrees, the spacing Ls between adjacent light source devices in the sub-scan direction can be secured as large as Ls=19.87, relative to the maximum contour P=5.6 of the package of the semiconductor laser.

This arrangement enables laser adjustment while making the light source means side movable, in an optical system having a plurality of light source means, which adjustment has been difficult to do conventionally. Thus, this embodiment has accomplished use of a light beam converting means 3 which is comprised of integrated compound lenses (four lenses).

It is to be noted that, although in this embodiment the laser barrels 11a-11d are directly attached to the laser barrel mounting member 12 of the optics box, the invention is not limited to this. For example, a subunit (so-called a laser unit) for holding a plurality of laser barrels 11a-11d at the same time may be prepared and, after having completed the laser adjustment in such state, the lasers may be put into the optics box. Similar advantageous results will be obtainable in that case.

As described above, in the present embodiment, a plurality of optical elements 3a-3d for converting the light focus state of the light beams from a plurality of light source means 1a-1d, are formed integrally, and after having adjusted the positions of the plurality of light source means 1a-1d relative to the corresponding optical elements 3a-3d, respectively, the light sources are held fixed.

With this arrangement, unification of stations in all components (light source means and light beam converting means) of a tandem type scanning optical device can be accomplished, such that enhancement of convenience in assembly can be realized without degrading the optical performance.

Furthermore, based on such scanning optical device, a color image forming apparatus which enables high-definition printing can be realized.

Embodiment 2

Figure 7:
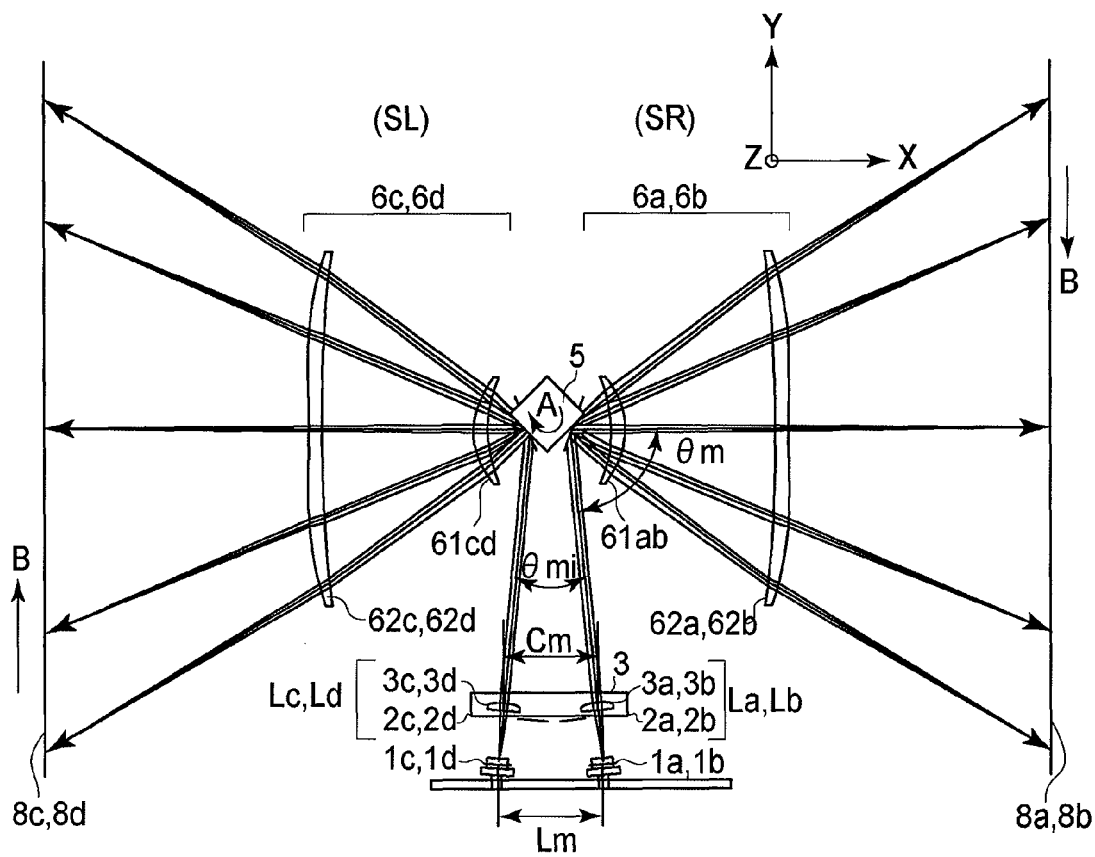
FIG. 7 is a sectional view in the main-scan direction of a main portion of a scanning optical device according to a second embodiment of the present invention.

FIG. 7 is a sectional view (main-scan sectional view) of a main portion of a scanning optical device, along a main-scan direction, according to a second embodiment of the present invention.

Figure 8:
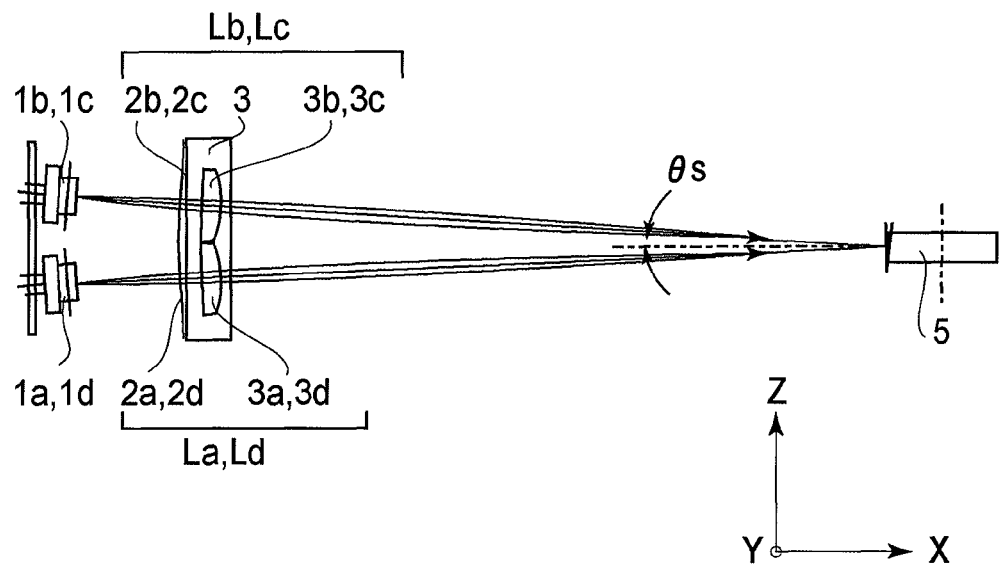
FIG. 8 is a sectional view in the sub-scan direction of a main portion of the scanning optical device according to the second embodiment of the present invention, from the deflecting means to the light source side.

FIG. 8 is a sectional view in the sub-scan direction of a main portion the second embodiment of the present invention, before the deflecting means thereof. The sub-scan section after the deflecting means is the same as that shown in FIG. 2 which is a sectional view of the first embodiment.

In FIG. 7 and FIG. 8, like numerals are assigned to components corresponding to those of FIG. 1 and FIG. 3.

The present embodiment differs from the abovementioned first embodiment in that, among the light beams directed to the deflecting means 5 from the light emitting members of a plurality of light source means 1a-4d, the light beams incident on different deflecting surfaces of the deflecting means 5 are made asymmetric within the main-scan section.

Additionally, the oblique incidence angle θs in the sub-scan direction is set accordingly.

Other structures and optical functions are similar to the first embodiment. Based on this, similar advantageous effects are obtainable.

More specifically, in the present embodiment, in order to assure a wide spacing between the light emitting members of a plurality of light source means 1a-4d in the main-scan direction, among the light beams directed to the deflecting means 5 from the plurality of light emitting members, the light beams which are incident on different deflecting surfaces of the deflecting means 5 are made asymmetric within the in main-scan section.

Furthermore, in this embodiment, the oblique incidence angle θs in the sub-scan direction is set to be smaller than in the first embodiment.

Table 2 shows designs values of the components from the light source means to the deflecting means in the present embodiment.

In the present embodiment as well, the light entrance surface (light source means side surface) of the optical element is comprised of a diffraction surface having different powers in the main-scan direction and the sub-scan direction.

Furthermore, the light exit surface of the optical element is comprised of a refracting surface having different powers in the main-scan direction and the sub-scan direction, namely, it is an anamorphic surface.

TABLE 2

Second Embodiment

|  | Rm | Rs | D | N |
|---|---|---|---|---|
| Light Sources 1a-1d |  |  | 2.00 |  |
| Cover Glass R1 | infinite |  | 0.25 | 1.51052 |
| Cover Glass R2 |  |  | 13.55 |  |
| Stops 2a-2d |  |  | 2.53 |  |
| Anamophic Collimator 3R1 | infinite *(1) |  | 3.00 | 1.52397 |
| Anamorphic Collimator 3R2 | −14.4784 | −12.0823 | 92.68 |  |
| Optical Origin |  |  |  |  |
| Anamorphic Collimator Phase Coefficient | $\phi m$: −7.83313E−3; | $\phi s$: −9.89926E−3 |  |  |
| No. of Polygon Surfaces | 4 |  |  |  |
| Polygon Circumscribed Circle Diameter | $\phi$ 20 |  |  |  |
| Optical Origin to Polygon Rotational Center | x: −5.4; Y: 4.6 |  |  |  |
| Main-Scan Direction Incidence Angle $\theta m$ | 86 |  |  |  |
| Sub-Scan Direction Incidence Angle $\theta s$ | 3 |  |  |  |
| Angle $\theta mi$ Defined by Light Beams Incident on Different Deflecting Surfaces | 8 |  |  |  |
| Spacing Lm between Light Sources in Main-Scan Direction | 15.88 |  |  |  |
| Spacing Ls between Light Sources in Sub-Scan Direction | 11.93 |  |  |  |
| Main-Scan Spacing Cm of Anarmophic Collimator Optical Elements | 13.33 |  |  |  |
| Maximum Contour P of Package of Light Source Means | 5.6 |  |  |  |
| Main-Scan Longitudinal Magnification $\alpha m$ between Light Source and Scan Surface | 52.2 |  |  |  |

Figure 9:
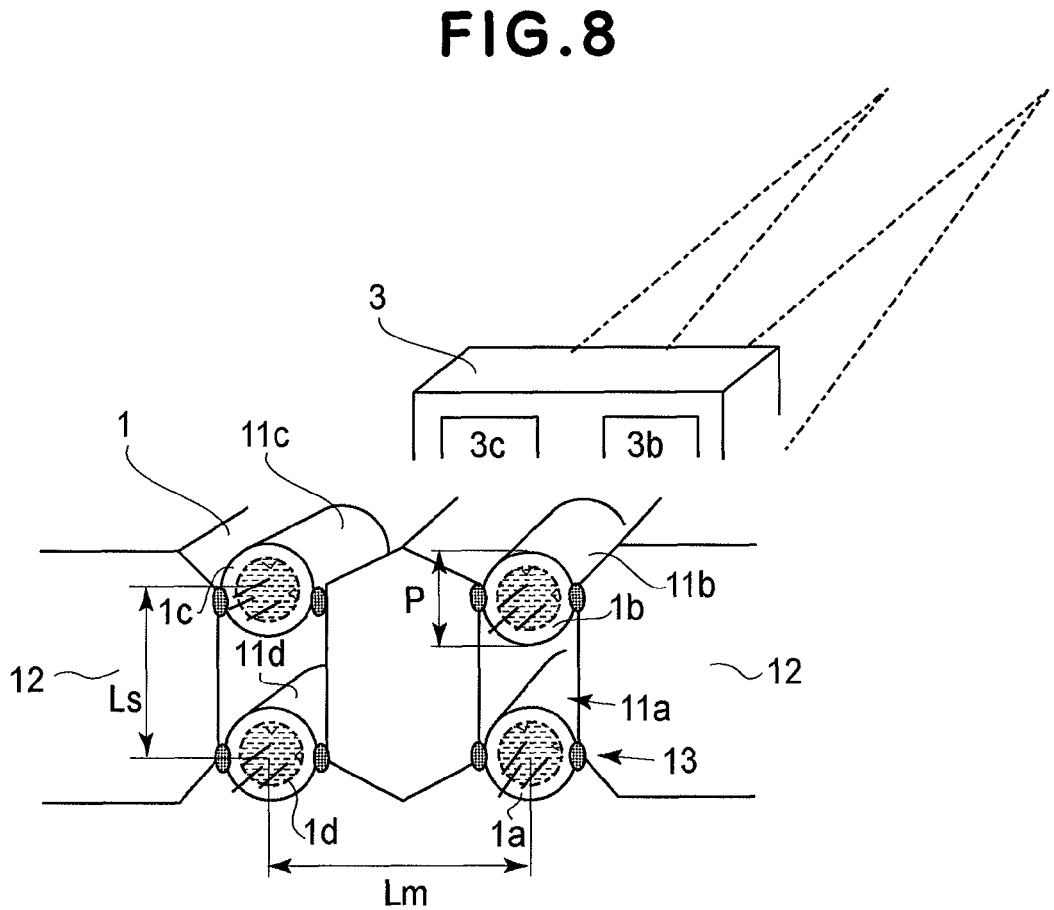
FIG. 9 is a schematic diagram of a main portion of a light source and a light beam converting means, in the scanning optical device of the second embodiment of the present invention.

FIG. 9 is a schematic diagram of a main portion of the light source means 1 and the light beam converting means 3 of the present embodiment. In FIG. 9, like numerals are assigned to components corresponding to those of FIG. 6.

In the present embodiment as well, like the abovementioned first embodiment, the light source means 1a-1d should have a space for accommodating a jig tool for gripping the laser barrels 11a-11d and a space for disposing a fiber for UV light irradiation.

In order to perform precise laser adjustment after having secured these spaces, the spacing between adjacent light source devices with respect to one of the main-scan direction and the sub-scan direction should be made larger than the maximum contour of the package of the semiconductor laser to be used actually.

In consideration of this, in this embodiment, among light beams directed to the deflecting means 5 from the light source means 1a-1d, the light beams incident on different deflecting surfaces are made non-paralleling to each other with respect to the main-scan direction. With this arrangement, the spacing of the light emitting members in the main-scan direction is secured.

Here, if the angle defined within the main-scan section by two light beams incident on different deflecting surfaces of the deflecting means 5 is denoted by $\theta mi$ (deg), a conditional expression (3) below should preferably be satisfied.

$$10 < \theta mi < 100 \tag{3}$$

The conditional expression (3) is a condition that specifies the $\theta mi$. If the lower limit of the conditional expression (3) is exceeded, it becomes difficult to sufficiently secure the spacing of the light emitting members of a plurality of light source means 1a-1d.

If on the other hand the upper limit of the conditional expression (3) is exceeded, the light beams from these light sources are too spaced away from each other, such that unification of the collimator lenses and integrally holding a plurality of light source means 1a-1d become difficult to do.

Furthermore, preferably, the above conditional expression (3) had better be set as follows.

$$2° < \theta mi < 9° \tag{3a}$$

Furthermore, if in the main-scan section the spacing between the centers of the light entrance surfaces of the plurality of optical elements 3a-3d constituting the light beam converting means 3 is denoted by Cm, and the spacing of the light emitting members of the plurality of light source means 1a-1d is denoted by Lm, a conditional expression (4) below should desirably be satisfied.

$$Cm < Lm \tag{4}$$

Conditional expression (4) specifies the magnitude relationship between the center spacing Cm of the light entrance surfaces of the plurality of optical elements and the spacing of the light emitting members of the plurality of light source means.

If the conditional expression (4) is not satisfied, the spacing Lm of the light emitting members of the plurality of light source means 1a-1d in the main-scan direction becomes small, and the laser adjustment at the light source means side becomes difficult to do.

In the present embodiment, the angle $\theta m$ which is defined between the principal ray of the light beam incident on the deflecting means 5 and the optical axis of the imaging optical means is set to $\theta m=86$ deg., by which the angle $\theta mi$ defined by these light beams in the main-scan direction is made equal to $\theta mi=8$ deg.

Furthermore, the directivity of the non-parallelism is so set that the center spacing of the light entrance surfaces of the plurality of optical elements 3a-3d and the spacing Lm of the light emitting members of the plurality of light source means 1a-1d satisfy the relations:

$$Cm=13.33$$

$$Lm=15.88$$

In addition to this, the aforementioned conditional expression (2) is satisfied.

With this arrangement, in the present embodiment, unification of collimator lenses and integral holding of a plurality of light source means 1a-1d are realized on one hand, and the spacing of the light emitting members in the main-scan direction which enables laser adjustment at the light source means side is secured on the other hand.

Furthermore, since a sufficient spacing is secured in the main-scan direction, the spacing Ls in the sub-scan direction can be made as small as Ls=11.93. Namely, the oblique incidence angle θs in the sub-scan direction can be set smaller than in the first embodiment. By the way, the oblique incidence angle θs in the present embodiment is θs=3 deg. as shown in Table 2.

As described above, in the present embodiment, a plurality of optical elements 3a-3d for converting the light focus state of the light beams from a plurality of light source means 1a-1d are formed integrally and, after having adjusted the positions of the plurality of light source means 1a-1d with respect to corresponding optical elements 3a-3d, these light sources are fixedly secured.

With this arrangement, unification of stations in all components (light source means and light beam converting means) of the tandem type scanning optical device can be accomplished and, furthermore, enhancement of convenience in assembly can be realized without degrading the optical performance.

Furthermore, based on such scanning optical device, a color image forming apparatus which enables high-definition printing can be realized.

Furthermore, as a feature peculiar to the present embodiment, by broadening the spacing of a plurality of light source means in the main-scan direction, the space in the sub-scan direction can be relatively narrowed. Thus, enhancement of optical properties due to the reduction of the oblique incidence angle in the sub-scan direction can be realized as well.

[Color Image Forming Apparatus]

Figure 10:
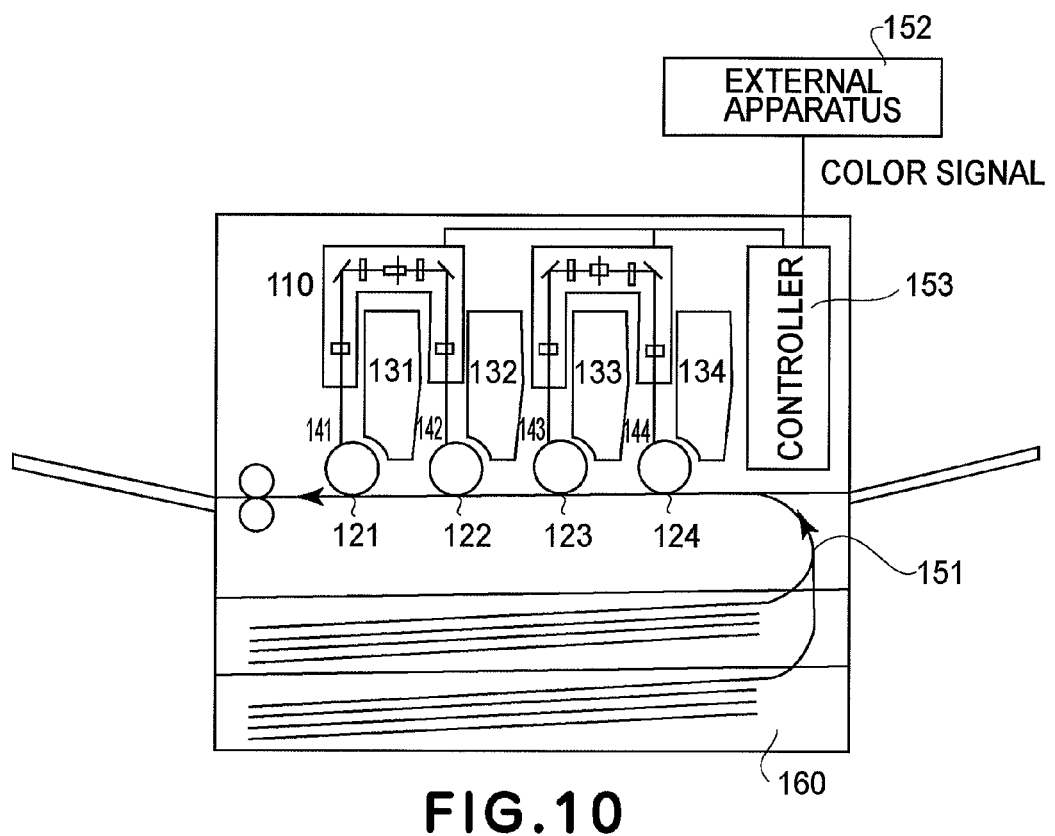
FIG. 10 is a schematic diagram of a main portion of a color image forming apparatus, according to the present invention.
Figure 11:
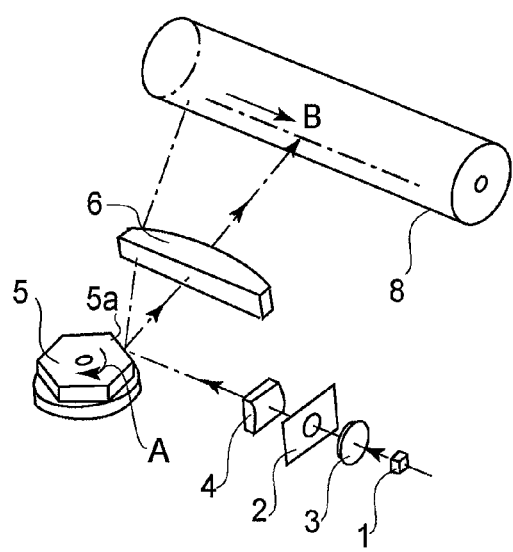
FIG. 11 is a perspective view of a main portion of a scanning optical device of a conventional example.
Figure 12:
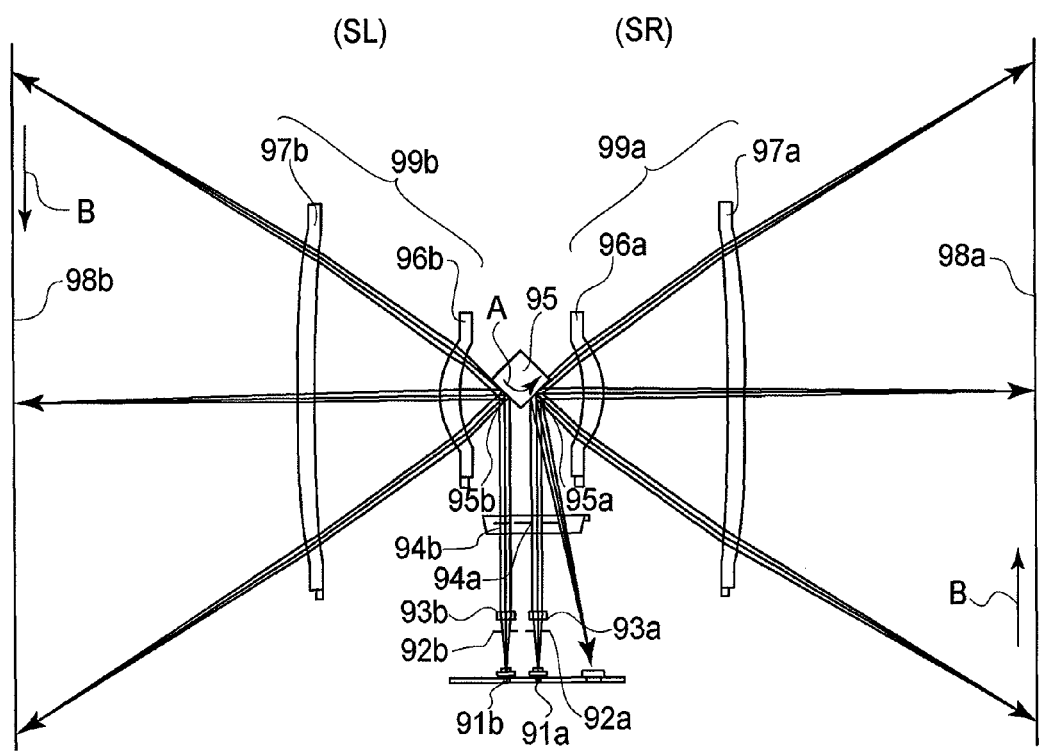
FIG. 12 is a sectional view in the main-scan direction of a main portion of a scanning optical device of conventional tandem type.

FIG. 10 is a schematic view of a main portion of a color image forming apparatus according to an embodiment of the present invention.

In FIG. 10, denoted generally at 160 is a color image forming apparatus, and denoted at 110 are scanning optical devices having a structure according to one of the first and second embodiments. Denoted at 121, 122, 123 and 124 are photosensitive drums (image bearing members), and denoted at 131, 132, 133 and 134 are developing devices, respectively. Denoted at 151 is a conveyance belt.

In FIG. 10, the color image forming apparatus 160 receives color signals of R (red), G (green) and B (blue) supplied thereto from an outside machine 152 such as a personal computer, for example. These color signals are transformed by means of a printer controller 153 inside the image forming apparatus, into imagewise data (dot data) corresponding to C (cyan), M (magenta), Y (yellow) and B (black).

These imagewise data are inputted into corresponding optical scanning devices 110, respectively. In response, these optical scanning devices produce light beams 141, 142, 143 and 144 having been modulated in accordance with the associated imagewise data. Through these light beams, the photosensitive surfaces of the photosensitive drums 121, 122, 123 and 124 are scanned in the main-scan direction.

As described, the color image forming apparatus of this embodiment uses four light beams from the optical scanning devices 110, based on respective image data, to produce latent images of different colors upon the surfaces of corresponding photosensitive drums 121, 122, 123 and 124, respectively. After that, these images are superposedly transferred onto a recording sheet, whereby a single full-color image is produced thereon.

As regards the outside machine 152, a color image reading machine having a CCD sensor, for example, may be used. In that occasion, this color image reading machine and the color image forming apparatus 160 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-263058 filed Oct. 9, 2007, for which is hereby incorporated by reference.

What is claimed is:

1. A method of adjusting a scanning optical device which includes a plurality of light source means, light beam converting means configured to convert a light focus state of a plurality of light beams emitted from said plurality of light source means, deflecting means having a plurality of deflecting surfaces configured to scanningly deflect light beams emergent from said light beam converting means and arranged such that light beams emitted from a plurality of light source means disposed spaced apart from each other in a main scan direction are incident on different deflecting surfaces of said deflecting means, and an imaging optical system configured to image light beams incident on different deflecting surfaces of said deflecting means upon different scan surfaces, respectively, wherein said light beam converting means is integrally formed by molding and is comprised of a plurality of optical elements each being configured to convert the light focus state of one associated light beam of the plurality of light beams emitted from said plurality of light source means, wherein denoting a spacing in the main-scan direction within a main-scan section of centers of light entrance surfaces of said plurality of optical elements constituting said light beam converting means by Cm, and a spacing in the main-scan direction of said plurality of light source means by Lm, a relation:

$$Cm < Lm$$

is satisfied, and wherein in said method of adjusting, each of the plurality of light source means is fixed to a holding member while a position thereof in an optical axis direction and a position thereof in a direction perpendicular to the optical axis, with respect to an associated one of the plurality of optical elements, are adjusted, and the plurality of light source means are fixed to one and the same holding member.

2. A method of adjusting a scanning optical device according to claim 1, wherein, denoting a spacing in the main-scan direction of said plurality of light emitting members of said plurality of light source means by Lm, and a maximum contour of a package of one light source means of said plurality of light source means by P, a relation $$Lm > 2P$$

is satisfied.

3. A method of adjusting a scanning optical device according to claim 1, wherein, denoting a longitudinal magnification in the main-scan section between said light emitting member of said light source means and the scan surface by $\alpha m$, a relation $$\alpha m < 100$$

is satisfied.

4. A method of adjusting a scanning optical device according to claim 1, wherein each of said plurality of optical elements of said light beam converting means comprises at least a collimator lens configured to convert a light beam emitted from said light emitting member of said light source means into a parallel light beam.

5. A method of adjusting a scanning optical device according to claim 1, wherein, denoting a spacing in the main-scan direction of said plurality of light emitting members of said plurality of light source means by Lm, a spacing in the sub-scan direction of said plurality of light emitting members of said plurality of light source means by Ls, and a maximum contour of a package of one light source means of said plurality of light source means by P, a relation $$\mathrm{Max}(Lm, Ls) > 2P$$

is satisfied, where Max(Lm,Ls) denotes the value of larger one of the spacings Lm and Ls.

6. A method of adjusting a scanning optical device according to claim 1, wherein, denoting an angle defined within the main-scan section by two light beams incident on different deflecting surfaces of said deflecting means by $\theta mi$ (deg), a relation $$1° < \theta mi < 10°$$

is satisfied.

7. A method of adjusting a scanning optical device according to claim 1, wherein each of optical axes of said plurality of optical elements constituting said light beam converting means is decentered within the main-scan section.

* * * * *